(12) United States Patent
Bohner (10) Patent No.: US 12,069,992 B2
(45) Date of Patent: Aug. 27, 2024

(54) AUTOMATIC WATERING VALVE ASSEMBLY

(71) Applicant: Torrent, LLC, Boise, ID (US)

(72) Inventor: Brian Bohner, Boise, ID (US)

( * ) Notice: Subject to any disclaimer, the term of this patent is extended or adjusted under 35 U.S.C. 154(b) by 199 days.

(21) Appl. No.: 17/522,813

(22) Filed: Nov. 9, 2021

(65) Prior Publication Data

US 2022/0142068 A1 May 12, 2022

Related U.S. Application Data

(60) Provisional application No. 63/111,578, filed on Nov. 9, 2020.

(51) Int. Cl.
*A01G 27/00* (2006.01)

(52) U.S. Cl.
CPC ......... *A01G 27/008* (2013.01); *A01G 27/003* (2013.01)

(58) Field of Classification Search
CPC ..... A01G 27/00; A01G 27/003; A01G 27/008
See application file for complete search history.

(56) References Cited

U.S. PATENT DOCUMENTS

| | | | |
|---|---|---|---|
| 1,063,395 A | 6/1913 | Scribner | |
| 4,270,696 A | 6/1981 | Pointer, Jr. | |
| 4,760,666 A | 8/1988 | Han | |
| 4,825,591 A | 5/1989 | Han | |
| 5,848,494 A | 12/1998 | Spelt | |
| 6,161,329 A * | 12/2000 | Spelt | A01G 27/00 47/79 |
| 6,845,588 B2 | 1/2005 | Muxlow | |
| 7,219,468 B1 | 5/2007 | Muxlow | |
| 9,338,951 B2 | 5/2016 | Anga | |
| 9,516,820 B1 * | 12/2016 | Logsdon | A01G 27/003 |
| 2004/0045218 A1 * | 3/2004 | Muxlow | A01G 27/003 47/79 |
| 2013/0014437 A1 * | 1/2013 | Schutter | A01G 27/003 177/60 |
| 2014/0069526 A1 | 3/2014 | Anga | |
| 2014/0076422 A1 | 3/2014 | Anga | |
| 2016/0324085 A1 * | 11/2016 | Potempa | A01G 27/008 |
| 2016/0338275 A1 * | 11/2016 | Johnson | A01G 27/003 |
| 2017/0215354 A1 * | 8/2017 | Johnson | A01G 27/008 |
| 2017/0215355 A1 * | 8/2017 | Johnson | A01G 27/003 |
| 2018/0070542 A1 | 3/2018 | Lockhart | |
| 2020/0154656 A1 * | 5/2020 | Taussig | A47G 7/047 |

FOREIGN PATENT DOCUMENTS

| | | | | |
|---|---|---|---|---|
| GB | 2190573 A | * | 11/1987 | ........... A01G 27/003 |
| WO | WO-9727734 A1 | * | 8/1997 | ............. A01G 27/00 |

\* cited by examiner

*Primary Examiner* — Monica L Perry
*Assistant Examiner* — Aaron M Rodziwicz
(74) *Attorney, Agent, or Firm* — Scott D. Swanson; Shaver Swanson (57) ABSTRACT

An automatic watering valve actuator assembly comprising a bracket that is attached to the watering valve assembly to a support member and a valve. The bracket comprises a clip having an enclosed elongate rectangular shape. The clip receives a hook from a hanging planter. When the hook is positioned on the clip, the actuator button of the valve is engaged allowing fluid flow there through.

12 Claims, 13 Drawing Sheets

AUTOMATIC WATERING VALVE ASSEMBLY

PRIORITY/CROSS REFERENCE

This application claims priority to U.S. Provisional Patent No. 63/111,578, filed on Nov. 9, 2020, the disclosure of which is incorporated herein by reference.

TECHNICAL FIELD

The presently disclosed technology relates to automatic watering systems. More particularly, the present invention is directed to an automatic watering system to be used with hanging planters.

BACKGROUND OF THE INVENTION

Hanging planters are planters that are configured for suspending a planter from a support structure containing a plant. Hanging baskets generally have a hook for suspending the basket from a support structure, such as a building, a pole, or railing.

Traditionally, hanging planters would either need to be removed from the hanging position to be watered or the water source would need to be raised up to the plant. The process of watering hanging planters in this fashion can be time consuming. It can also be physically demanding depending on the height of the planter and the weight of the plant, if it is being removed. What is needed is an improved mechanism to provide water to a plant in a hanging basket.

SUMMARY OF THE INVENTION

The purpose of the summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the inventive concept(s) of the application, which is measured by the claims, nor is it intended to be limiting as to the scope of the inventive concept(s) in any way.

In accordance with the present invention, a new and improved automatic hanging planter watering assembly is provided. The invention automatically waters a hanging planter when the hook of the hanging planter is placed in the device. More particularly in accordance with the invention, the automatic watering valve assembly has a bracket and a valve attached to or proximate to the bracket. The bracket is configured to mount the device to a support member from which a planter may be hung. The bracket as opposing flanges that define an opening in the bracket, approximately in the middle thereof. The opening can receive a hook from a planter hanger. The bracket can have a mounting clip that secures the valve to the bracket.

The valve has an actuator button. In one embodiment the actuator button is positioned such that it faces inward to the opening of the bracket. In a different embodiment, the actuator button is positioned on the top of the valve. The valve also has an inlet opening and outlet opening. The inlet opening can receive a tube or hose or otherwise be connected to a fluid source. The outlet opening can also be connected to a tube or hose. When the actuator button is activated, the fluid received from the fluid source to the inlet opening is released via the outlet opening. When released, the fluid can be directed, via the attached hose or tube, to water a hanging plant.

In one embodiment, the bracket also includes a biasing tab. The biasing tab is positioned opposite the valve on the bracket. The biasing tab will bias a hook positioned in the opening towards the actuator button. In this position, the hook will activate the actuator button and fluid can be released from the outlet opening.

In another embodiment of the present invention, the bracket has an angled slot opening. The angled slot opening is configured for accepting a hook and biasing the hook towards the valve. In another embodiment of the present invention, the bracket has both an angled slot opening and a biasing tab. The combination of the angled slot opening and biasing tab is configured to bias a hook towards the actuator button of the valve.

In another embodiment, the bracket has a flange positioned on the front thereof to attach to a valve. In this embodiment, the bracket also has a clip that attaches to the front of the bracket. The valve has an inlet opening that can be attached to a fluid source. The valve also has an outlet opening that can attach to a tube or hose. The outlet opening releases fluid from the valve when the valve is activated. In this embodiment, the valve has an actuator button positioned substantially on the top of the valve. The actuator button positioned on the top of the valve is activated by the clip attached to the bracket. The clip has an upper tab with an engagement flange. The engagement flange rests on top of the actuator button such that it can engage the actuator button. The clip also has a lower tab. The lower tab is designed to receive a hook from a hanging planter. In one embodiment, the clip is an enclosed elongate rectangular shape with the middle thereof being open. When the hook of a hanging plant is positioned in the lower tab of the clip, the engagement flange of the upper tab depresses the actuator button allowing for the release of fluid through the outlet opening.

The present invention may be made from a sheet metal material including but not limited to, aluminum, brass, copper, steel, or other metals used in sheet metal manufacture. Alternatively, the invention may be made from a durable plastic material.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

DISCLOSURE

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

Figure 1:
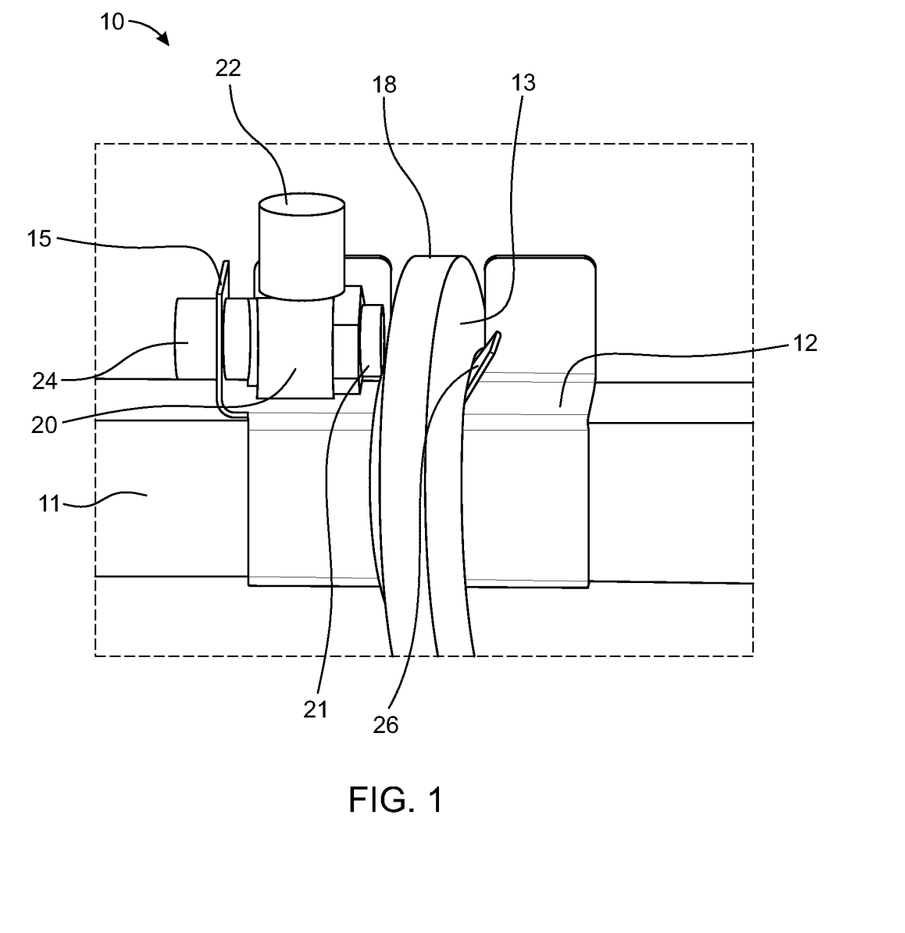
FIG. 1 is a front view of an embodiment of an automatic watering valve assembly.
Figure 2:
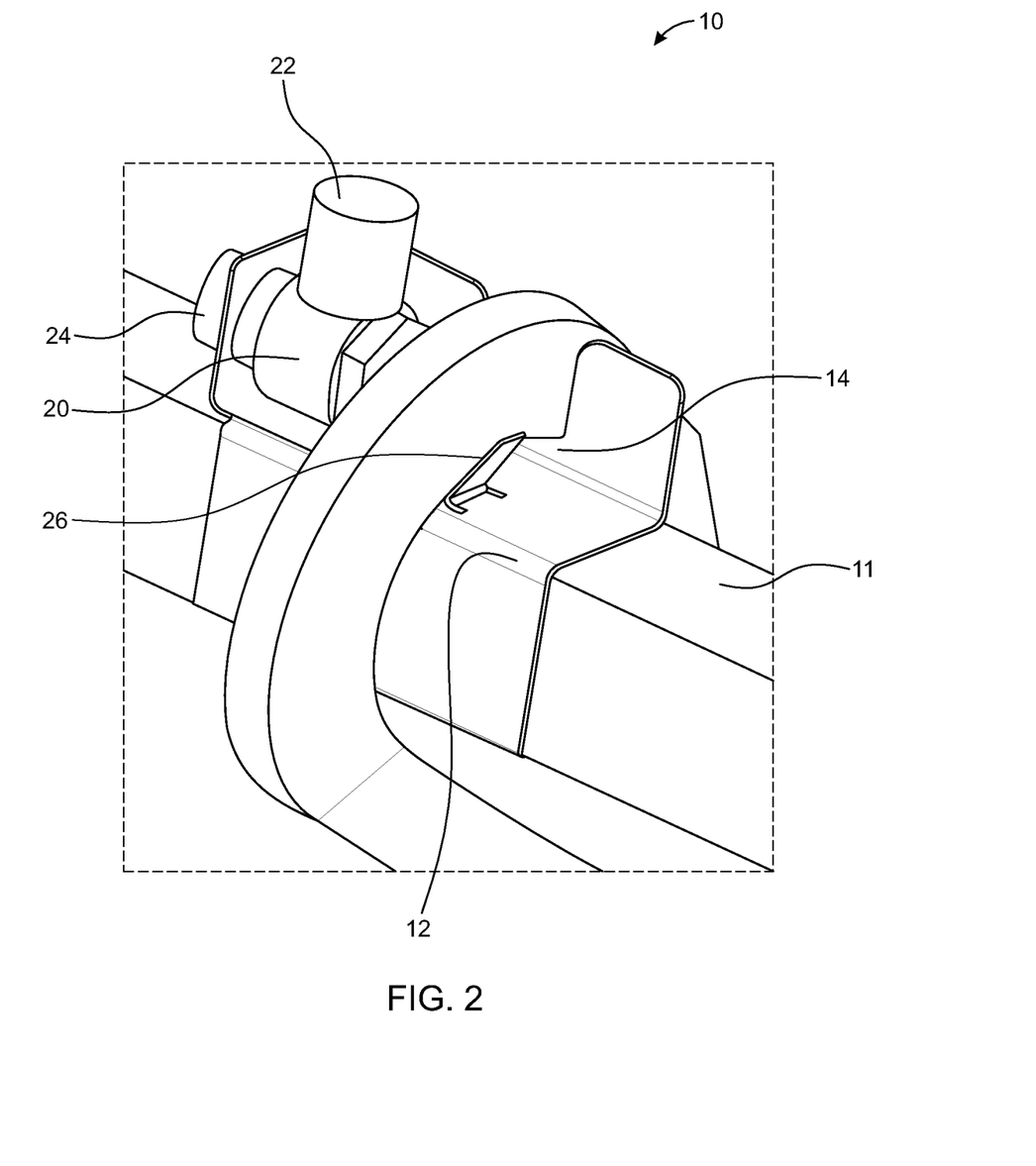
FIG. 2 is a perspective view of the automatic watering valve assembly of FIG. 1.
Figure 3:
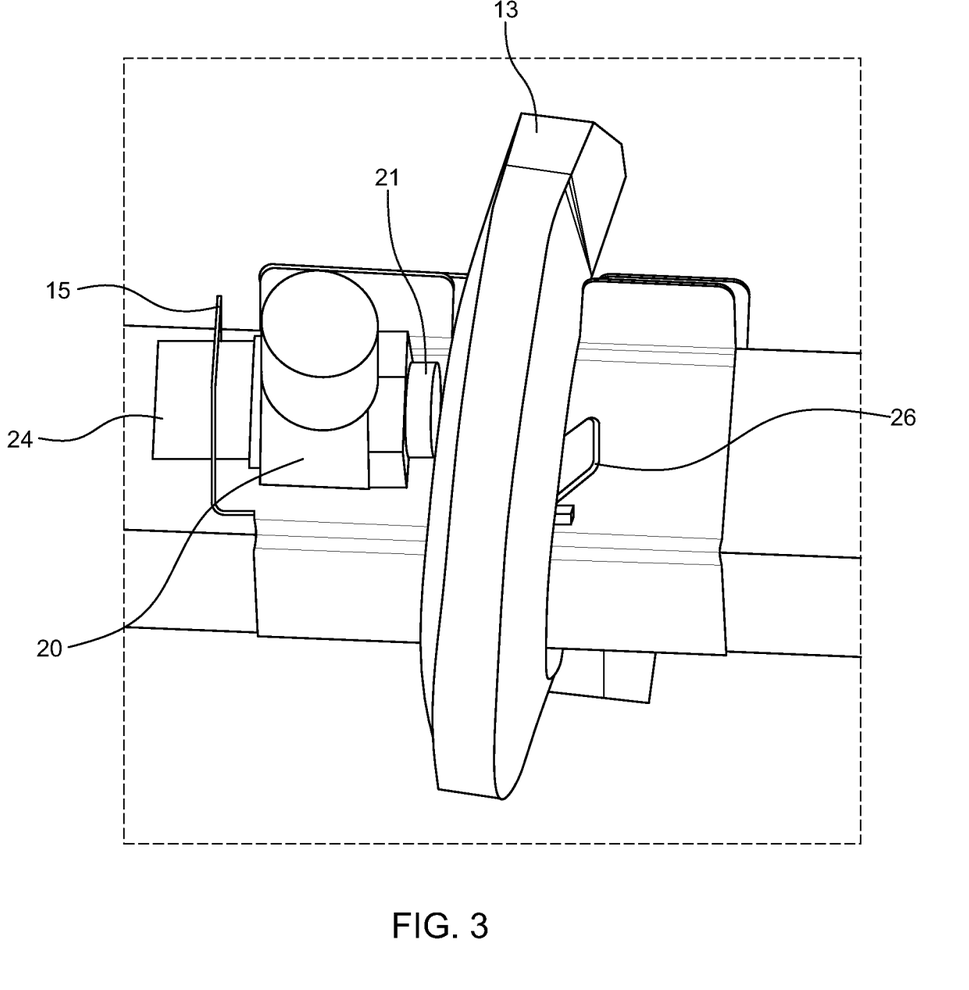
FIG. 3 is a top view of the automatic watering valve assembly of FIG. 1.
Figure 4:
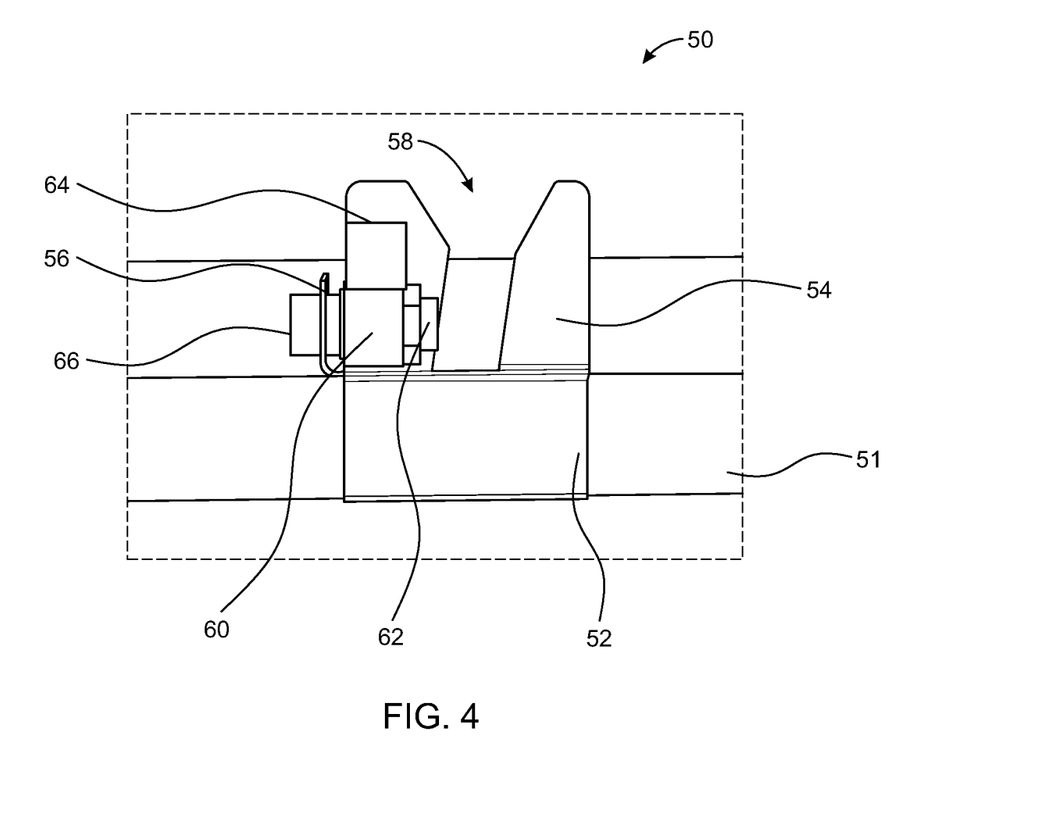
FIG. 4 is a front view of an embodiment of an automatic watering valve assembly.
Figure 5:
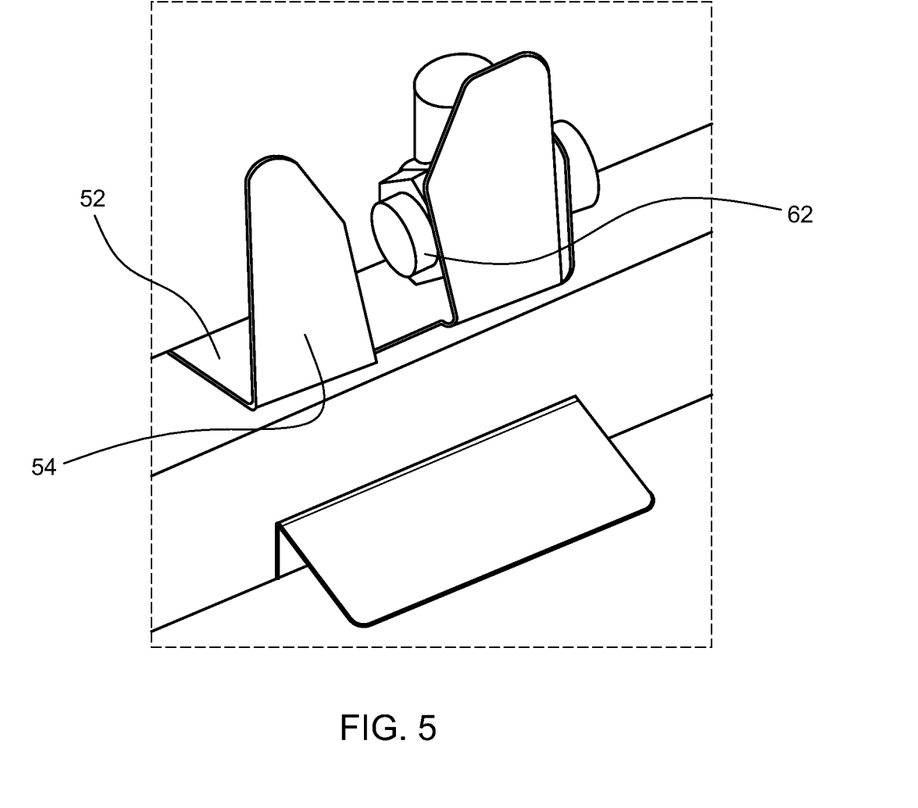
FIG. 5 is back perspective view of the automatic watering valve assembly of FIG. 4.
Figure 6:
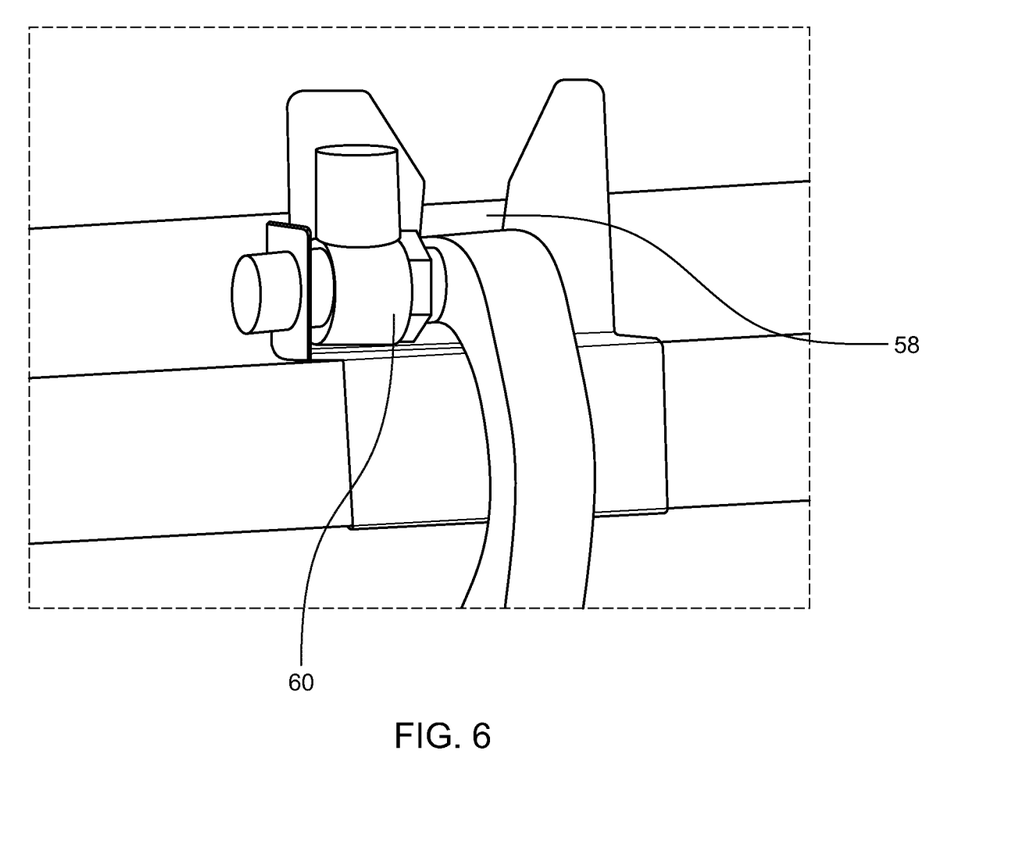
FIG. 6 is a front perspective view of an embodiment of an automatic watering valve assembly of FIG. 4.
Figure 7:
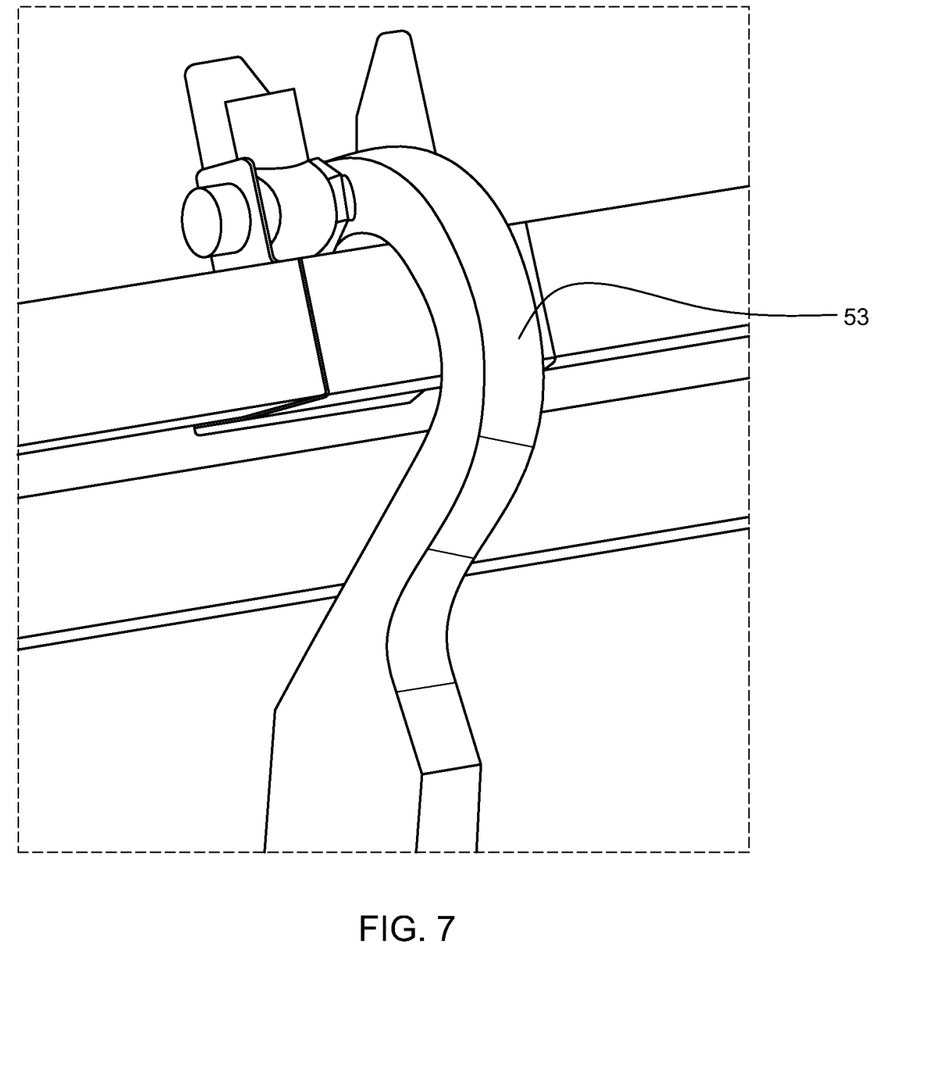
FIG. 7 is a side perspective view of an embodiment of an automatic watering valve assembly of FIG. 4.

FIGS. 1-3 illustrate a first embodiment of an automatic watering valve assembly 10. In a first embodiment, the bracket 12 is configured to attach to a support structure. In the first embodiment, the bracket is configured for attaching the automatic watering valve assembly 10 to a hanging rod 11 or other support structure a user intends to attach the automatic watering valve assembly.

In the first depicted embodiment a valve 20 is attached to the bracket 12. The valve 20 preferably has a push button 21. The valve 20 is positioned on the bracket 12 such that the push button 21 is directed inwards the bracket 12. The valve 20 has an inlet opening 22 and an outlet opening 24. The inlet opening 22 and outlet opening 24 are configured for attachment to a flexible tube (not shown), including but not limited to, a water hose, Tygon® tubing, or other flexible polymer tubing for fluid transfer known in the art. Tubing attached to the inlet opening 22 is attached to a water source. Tubbing attached to the outlet opening 24 is configured for watering the planter.

In one embodiment, the bracket 12 utilizes a flange 14. The flange 14 preferably defines a slot opening 18. The slot opening 18 is configured to receive the hook 13 of a hanging planter.

In one embodiment the bracket has a biasing tab 26 positioned proximate to the slot opening 18 and opposite from the valve 20. The biasing tab 26 stabilizes the hook 13 from horizontal rotation within the slot opening 18. The flange 14 is configured to guide the hook 13 of a hanging planter through the slot opening 18 to the biasing tab 26. The biasing tab 26 biases the hook to engage the push button 21 positioned on the valve 20. The push button 21, when engaged, actuates the valve 20 to allow fluid to flow out the outlet opening 24 to water the plants.

The valve 20 is preferably horizontally positioned on the bracket 12 proximate to the slot opening 18. The push button 21 of the valve 20 extends toward the slot opening 18 so that when a hook is inserted into the slot opening 18 the biasing tab 26 biases the hook 13 to actuate the valve 20. When valve 20 is actuated, fluid flows through the inlet opening 22 exiting through the outlet opening 24, resulting in the irrigation of the hanging planter.

In one embodiment, the bracket 12 is made of sheet metal, including but not limited to, aluminum, brass, copper, steel, or other metals used in sheet metal manufacture. Alternatively, the bracket 12 may be made from a durable plastic material.

In one embodiment, the valve 20 is attached to the bracket 12 at a valve mounting clip 15 positioned on the bracket 12. The valve mounting clip 15 is preferably positioned opposite the biasing tab 26 on the bracket 12. The valve mounting clip 15 is configured to receive the outlet opening 24 and secure the valve to the bracket 12. Alternatively, the valve can be attached to the bracket via clamps or other fastener type, or the valve can be attached proximate to the bracket such that the valve is secured by placing the hook of a hanging planter into the slot of the bracket.

FIGS. 4-7 illustrate a second embodiment of the automatic watering assembly 50. The automatic watering assembly 50 utilizes a bracket 52 and a valve 60. The valve 60 has a actuator button 62 to actuate the valve 60. The bracket 52 is configured for attaching to a rod 51 or other support structure a user desires to attach the automatic watering assembly 50. The bracket 52 has a flange 54 that defines an angled slot opening 58. The angled slot opening 58 is configured receive a hook 53 and to bias the hook 53 against the actuator button 62 of the valve 60.

The valve 60 has an inlet opening 64 and an outlet opening 66. The inlet opening 64 and outlet opening 66 are configured for attachment to a flexible tube (not shown), including but not limited to, a water hose, Tygon® tubing, or other flexible polymer tubing for fluid transfer known in the art. Attachment may be achieved via threaded engagement of the flexible tub with the respective opening. Alternatively, attachment may be achieve via a force fit or clamping engagement. Other suitable means of attaching the flexible tubing to a respective opening can also be utilized and would be readily understood by a person having ordinary skill in the art.

Tubing attached to the inlet valve 64 is attached to a water source. Tubing attached to the outlet opening 66 is configured for watering the planter. When the valve 60 is actuated by the hook pushing against the push button 62 of the valve 60, water flows from the inlet opening 62 through the valve 60 and out the outlet opening 64. The flexible tubing attached to the outlet opening may be positioned such that when water flows through the tubing, a hanging planter will be watered.

The valve 60 is preferably configured to be removable from the bracket 52, allowing the valve 60 to be replaced. The bracket 52 can have a valve mounting clip 56. The valve mounting clip 56 is configured to receive the outlet opening 66 and secure the valve 60 to the bracket 52. Alternatively, the valve 60 can be attached to the bracket via clamps or other fastener type, or the valve can be configured for secure attachment into the bracket. The bracket and valve can potentially be manufactured as a single piece. In an alternate embodiment, the bracket can include an angled slot opening and a biasing tab.

Figure 8:
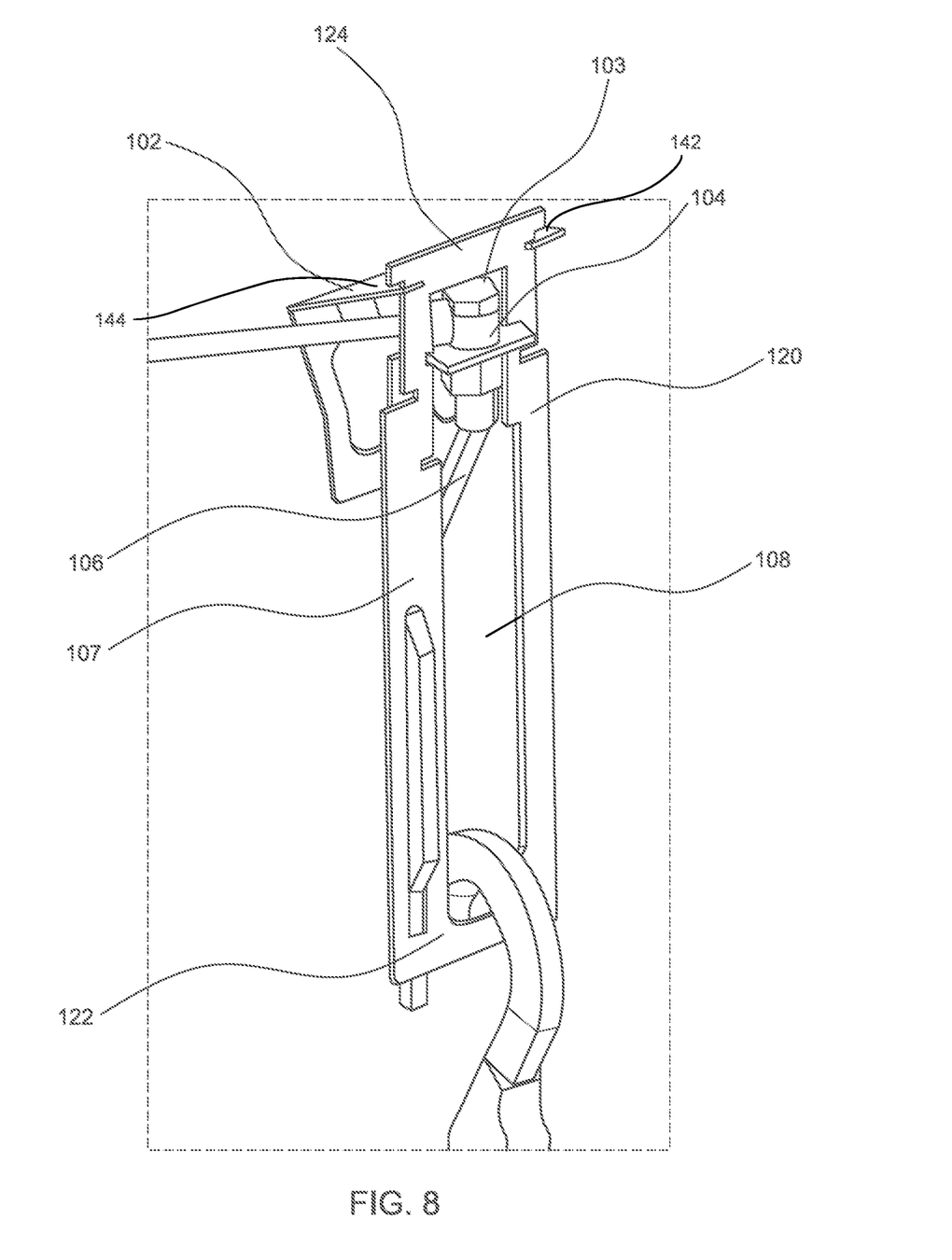
FIG. 8 is a perspective view of an embodiment of an automatic watering valve assembly having a hanger.
Figure 9:
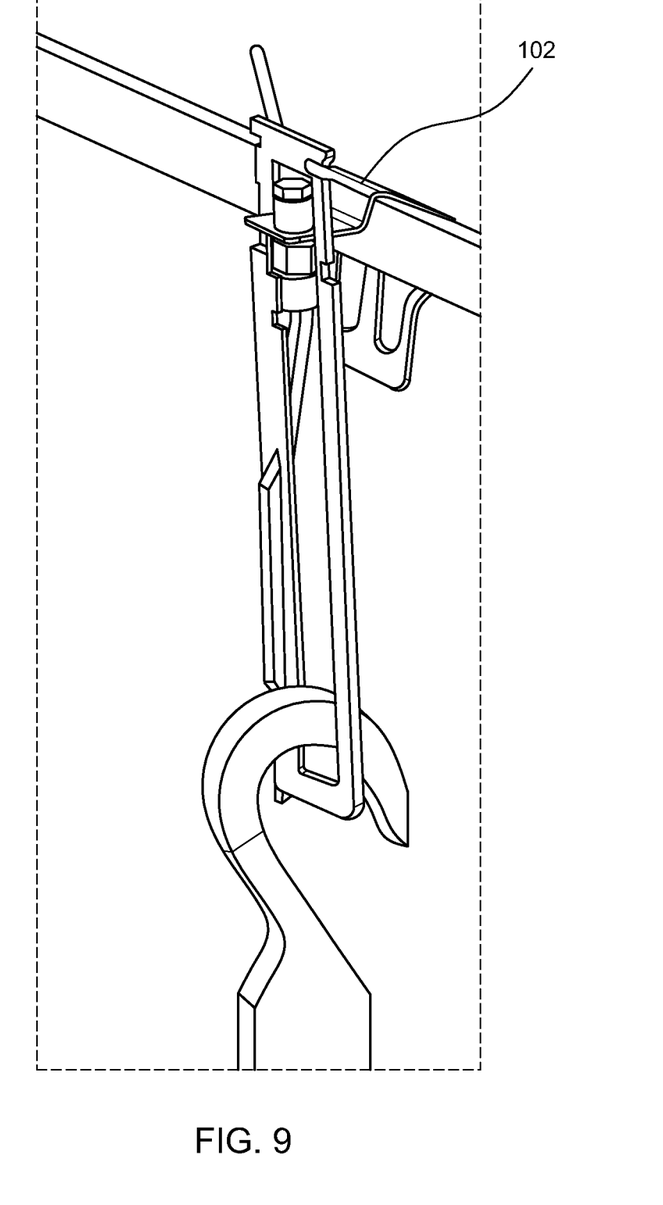
FIG. 9 is a perspective view of the embodiment of FIG. 8 as attached to a support member.
Figure 10:
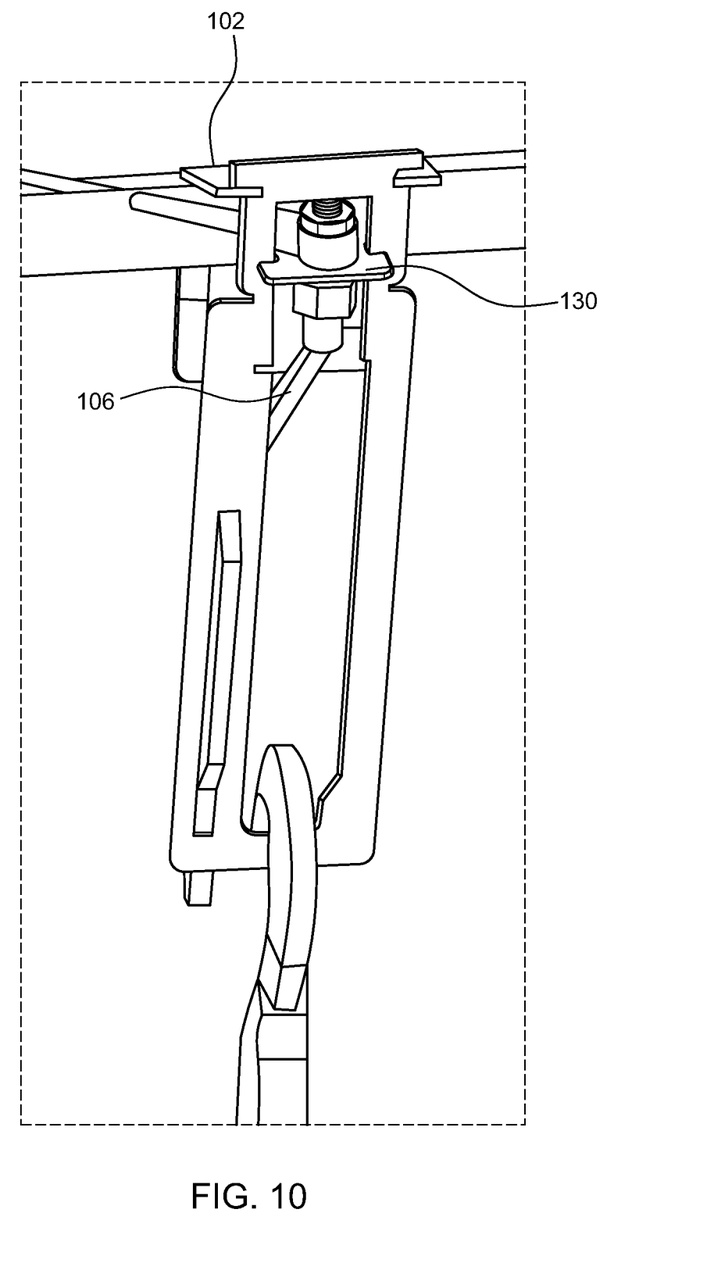
FIG. 10 is perspective view of the embodiment of FIG. 8 wherein an actuator button is engaged by the hanger assembly.

FIG. 8-10 depict another embodiment of the present invention. This embodiment has a bracket 102. The bracket 102 is configured to be attached to a support frame or other structure from which a planter may be hung. The bracket 102 surrounds an irrigation valve 104 via a front attachment flange 130. The valve 104 has an inlet opening 132 and an outlet opening 134. The inlet opening 132 is configured to attach the valve 104 to a fluid source. The outlet opening 134 is configured to attach to a tube or hose 106. The hose 106 can direct fluid being released to a hanging planter.

The irrigation valve 104 has an actuator button 103 positioned on the top thereof. The actuator button is configured such that upon depression thereof, fluid can flow through the valve to a hose 106 attached thereto. The bracket 102 has a clip 107. A hanger 108 extends between an upper tab 120 and a lower tab 122 of the clip 107. The upper tab 120 of the clip 107 has an engagement flange 124 that is configured to attach the clip 107 to the bracket 102 such that clip rests on top of the actuator button. The engagement flange 124 attaches to opposing forward flanges 142, 144 of the bracket 102 to secure the clip in position. The lower tab 122 of the clip is configured to receive the hook of a hanging planter.

The hanger 108 can have a top opening 138 positioned on a first side thereof. The hanger 108 has a lower opening 140 positioned a distance below the top opening 138 on the same side of the hanger 108. The top opening 138 and the lower opening 140 are configured to thread the hose 106. In this arrangement, the hose 106 maintains a close relationship with the hanger 106 and allows for easy positioning of the hose for fluid release.

FIG. 10 illustrates the weight of the hanging planter depressing the button of the valve. The weight of the hanging planter causes the clip to actuate the actuator button facilitating the flow of liquid through the hose 106 to allow the hanging plant to be watered.

The bracket 102 is composed of a sturdy and durable material. The bracket may be made from a durable plastic material, or metal material. The metal material is preferably made of sheet metal, including but not limited to, aluminum, brass, copper, steel, or other metals used in sheet metal manufacture. Similarly, the clip 107 is composed of a sturdy and durable material. The clip may be made from a durable plastic material, or a metal material. The metal material is preferably made of sheet metal, including but not limited to, aluminum, brass, copper, steel, or other metals used in sheet metal manufacture.

Figure 11:
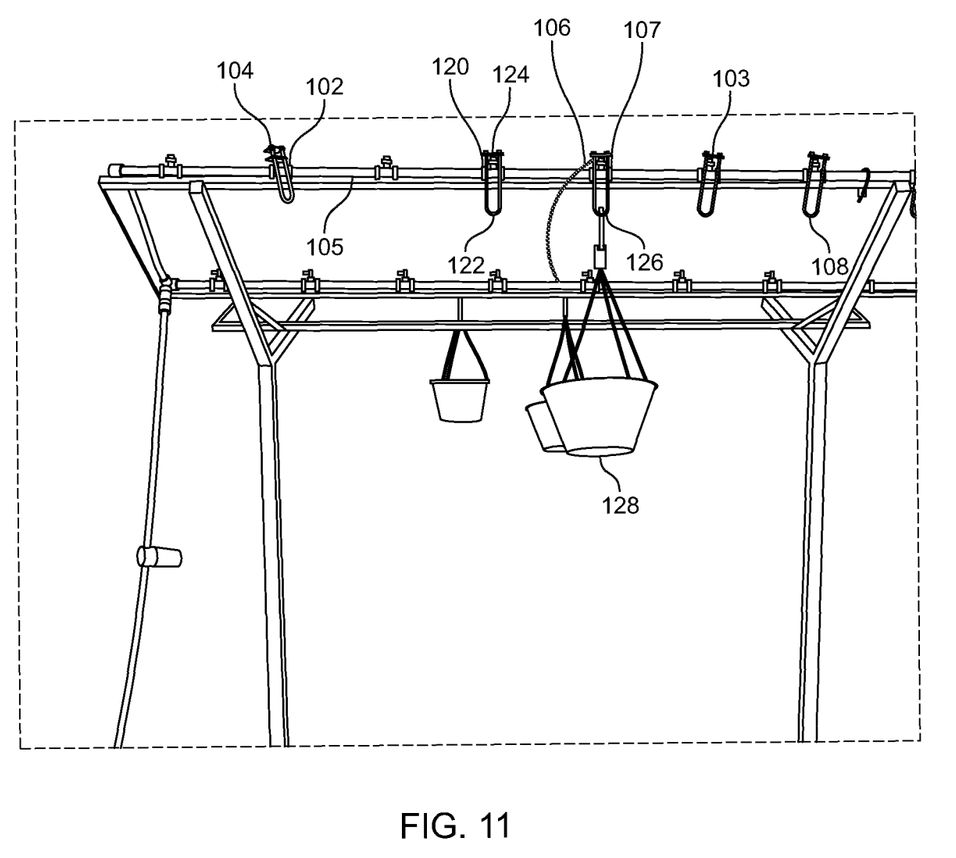
FIG. 11 is a perspective view of an embodiment of an automatic watering valve assembly as connected in serial fashion along a support member.
Figure 12:
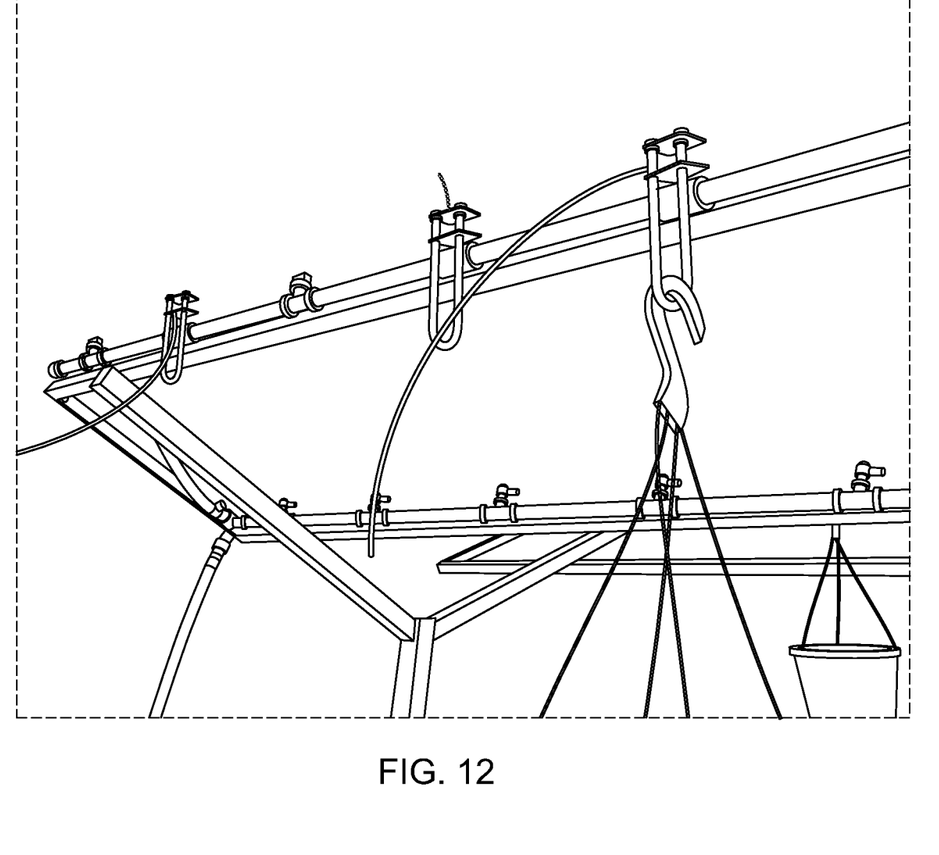
FIG. 12 is a zoomed in view of the embodiment of FIG. 11 as connected in serial fashion.
Figure 13:
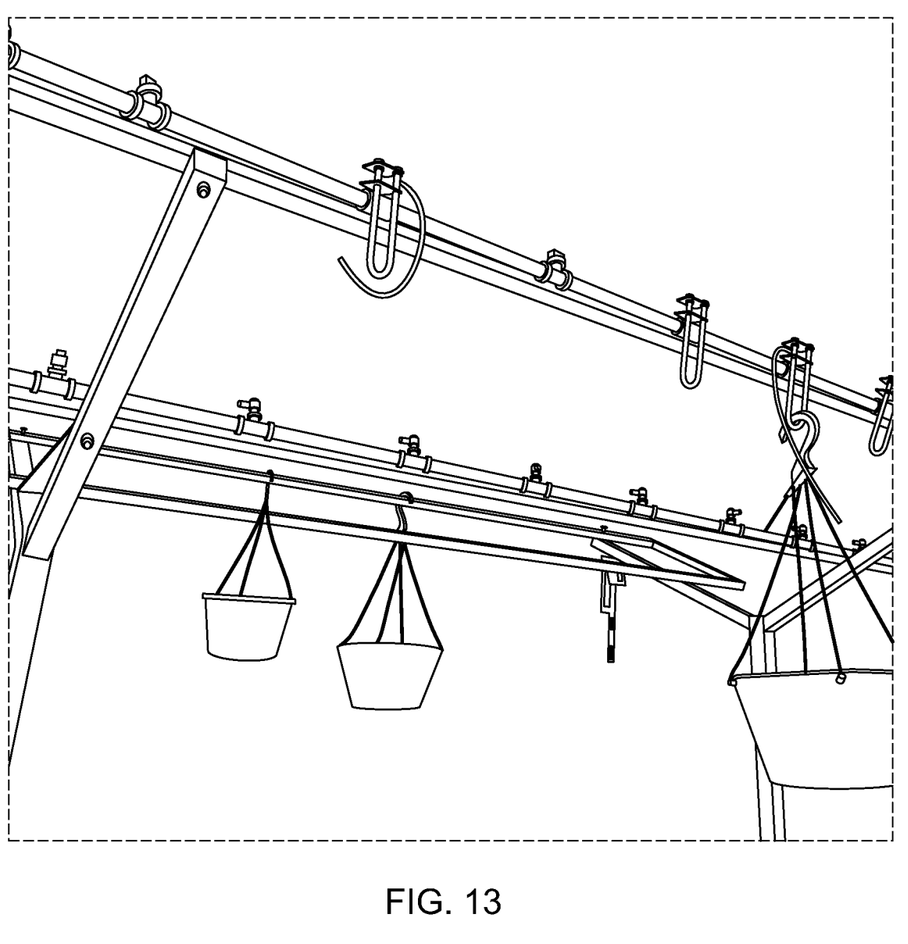
FIG. 13 is a perspective view of the embodiment of FIG. 11.

FIGS. 11-13 illustrate an embodiment of an automatic watering assembly according to the present disclosure connected in serial fashion. A first automatic watering assembly is positioned along the support structure. A second automatic watering assembly is positioned a distance down the support structure from the first automatic watering assembly. The automatic watering assemblies each utilize the same water source. The water source is directed to each automatic watering assembly via an independent inlet opening that is positioned on the valve thereof. Each automatic watering assembly has an independent outlet opening with a flexible tubing attached thereto. In this fashion, a single water source may be used to water multiple hanging planters.

As depicted in FIGS. 11-13, a bracket 102 positioned on an irrigation valve 104 the irrigation valve is positioned on a water delivery pipe 105 that delivers water to a plurality of valves. The valve has an actuator button 103 that is configured such that depression of the actuator button allows fluid to flow through a hose 106 attached to the valve. The bracket 102 has a clip 107. The clip is deflected at an angle to be hung on the square tubing of the frame. A hanger 108 extends between an upper tab 120 and lower tab 122 of the clip 107. The clip 107 has an engagement flange 124 that causes the clip and hanger too be positioned such that the hanger rests on top of the valve button. When a hanging planter is positioned in the lower tab 122, the weight of the planter causes the upper tab 120 to depress the actuator button 103 allowing fluid to flow through the hose connected thereto.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

I claim:

1. An automatic watering valve actuator assembly, said automatic water valve comprising:
    a valve, said valve having an inlet opening, an outlet opening and an actuator button, wherein said inlet opening is configured to attach said valve to a fluid source and receive fluid from a fluid source to said valve, wherein said actuator button is positioned at a top of said valve and said actuator button is configured to open said valve when said actuator button is depressed to allow fluid flow through said actuator from said inlet opening to said outlet opening, wherein said outlet opening is configured to attach to a tube;
    a bracket, wherein said bracket is configured to attach said automatic watering valve assembly to a support member, wherein said bracket has a front attachment flange and two opposing forward flanges, wherein said valve is mounted to said front attachment flange;
    a clip attached to said bracket, said clip having a lower tab at a bottom end of said clip below said valve, and an engagement flange at a top end of said clip positioned above said actuator button, wherein said clip is supported by said two opposing forward flanges; and
    said lower tab being configured to receive a hook from a hanging planter such that positioning of the hook from the hanging planter causes the engagement flange to depress said actuator button.

2. The automatic watering valve actuator assembly of claim 1, wherein said clip is an elongate rectangular shape with said lower tab forming a lower edge of said rectangular shape, wherein said elongate rectangular shape defining an opening positioned above said lower tab to receive said hook from said hanging planter.

3. The automatic watering valve assembly of claim 2, wherein said actuator tab forms an upper edge of said rectangular shape.

4. The automatic watering valve assembly of claim 2, wherein said valve is positioned within said opening.

5. The automatic watering valve assembly of claim 1, wherein said outlet opening further comprises said tube, wherein said tube is attached to said outlet opening and said tube is configured to direct said fluid flow from said valve to a basket of said hanging planter.

6. The automatic watering valve assembly of claim 1, wherein said bracket is made from a sheet metal material.

7. The automatic watering valve assembly of claim 1, wherein said clip is made from a sheet metal material.

8. The automatic watering valve assembly of claim 1, wherein said bracket is made from a plastic material.

9. The automatic watering valve assembly of claim 1, wherein said clip is made from a plastic material.

10. The automatic watering valve assembly of claim 1, wherein said valve is positioned between said two opposing forward flanges.

11. The automatic watering valve assembly of claim 1, wherein said clip comprises an elongate ring shape.

12. The automatic watering valve assembly of claim 11, wherein said elongate ring shape comprises an elongate rectangular ring shape.

* * * * *